(12) United States Patent
Higuchi et al.

(10) Patent No.: US 12,706,301 B2
(45) Date of Patent: Aug. 11, 2026

(54) NONAQUEOUS ELECTROLYTE SECONDARY BATTERY POSITIVE ELECTRODE, AND NONAQUEOUS ELECTROLYTE SECONDARY BATTERY

(71) Applicant: SANYO Electric Co., Ltd., Kadoma (JP)

(72) Inventors: Takatoshi Higuchi, Hyogo (JP); Yuu Takanashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 986 days.

(21) Appl. No.: 17/783,087

(22) PCT Filed: Dec. 8, 2020

(86) PCT No.: PCT/JP2020/045580

§ 371 (c)(1),
(2) Date: Jun. 7, 2022

(87) PCT Pub. No.: WO2021/124971

PCT Pub. Date: Jun. 24, 2021

(65) Prior Publication Data

US 2023/0014664 A1 Jan. 19, 2023

(30) Foreign Application Priority Data

Dec. 18, 2019 (JP) ................................ 2019-228272

(51) Int. Cl.
*H01M 4/131* (2010.01)
*H01M 4/36* (2006.01)
(Continued)

(52) U.S. Cl.
CPC ........... *H01M 4/364* (2013.01); *H01M 4/131* (2013.01); *H01M 4/525* (2013.01); *H01M 4/62* (2013.01);
(Continued)

(58) Field of Classification Search
CPC ........ H01M 4/364; H01M 4/131; H01M 4/62; H01M 4/525
See application file for complete search history.

(56) References Cited

U.S. PATENT DOCUMENTS

2006/0216605 A1* 9/2006 Shirakata ............. H01M 4/364 429/231.95
2007/0026312 A1* 2/2007 Imachi ................ H01M 4/1391 429/231.95
(Continued)

FOREIGN PATENT DOCUMENTS

CN 103401016 A 11/2013
CN 108123096 A 6/2018
(Continued)

OTHER PUBLICATIONS

Office Action dated Nov. 1, 2023, issued in counterpart CN Application No. 202080085521.5, with partial English translation.(11 pages).
(Continued)

*Primary Examiner* — Kenneth J Douyette
(74) *Attorney, Agent, or Firm* — WHDA, LLP

(57) ABSTRACT

The present nonaqueous electrolyte secondary battery positive electrode comprises a positive electrode core, and a positive electrode composite material layer formed on the surface of the positive electrode core. The positive electrode composite material layer includes at least a positive electrode active material, and lithium phosphate. The positive electrode active material includes a first positive electrode active material wherein the Ni content relative to the total molar amount of metal elements other than Li is 50-65 mol %, and a second positive electrode active material wherein the Ni content relative to the total molar amount of metal elements other than Li is 45 mol % or less. The ratio of the first positive electrode active material to the second positive
(Continued)

electrode active material in the positive electrode composite material layer is, by mass ratio, from 80:20 to 50:50.

4 Claims, 1 Drawing Sheet

(51) Int. Cl.

| | |
|---|---|
| ***H01M 4/525*** | (2010.01) |
| ***H01M 4/62*** | (2006.01) |
| ***H01M 10/05*** | (2010.01) |
| *H01M 4/02* | (2006.01) |

(52) U.S. Cl.

CPC ...... *H01M 10/05* (2013.01); *H01M 2004/021* (2013.01); *H01M 2004/028* (2013.01)

(56) References Cited

U.S. PATENT DOCUMENTS

| | | | | |
|---|---|---|---|---|
| 2011/0177364 | A1 | 7/2011 | Miyazaki et al. | |
| 2011/0240913 | A1 | 10/2011 | Kim et al. | |
| 2016/0126557 | A1* | 5/2016 | Kataoka | H01M 4/667 429/231.95 |
| 2017/0018818 | A1* | 1/2017 | Miura | H01M 4/5825 |
| 2019/0173085 | A1 | 6/2019 | Sugimori et al. | |
| 2019/0386299 | A1 | 12/2019 | Tochio et al. | |
| 2020/0091515 | A1 | 3/2020 | Takezawa et al. | |
| 2021/0288311 | A1 | 9/2021 | Ko et al. | |

FOREIGN PATENT DOCUMENTS

| | | | |
|---|---|---|---|
| CN | 108352564 | A | 7/2018 |
| CN | 109792048 | A | 5/2019 |
| JP | 2011-150873 | A | 8/2011 |
| JP | 2011-216485 | A | 10/2011 |
| JP | 2018-49775 | A | 3/2018 |
| JP | 2018-185936 | A | 11/2018 |
| JP | 2019-29205 | A | 2/2019 |
| JP | 2019-67670 | A | 4/2019 |
| KR | 10-2016-0080244 | A | 7/2016 |
| WO | 2018/061815 | A1 | 4/2018 |
| WO | 2018/123603 | A1 | 7/2018 |
| WO | 2018/221024 | A1 | 12/2018 |

OTHER PUBLICATIONS

International Search Report dated Feb. 22, 2021, issued in counterpart International Application No. PCT/JP2020/045580 (3 pages).

Office Action dated Jan. 7, 2025, issued in counterpart JP Application No. 2021-565490. (4 pages).

* cited by examiner

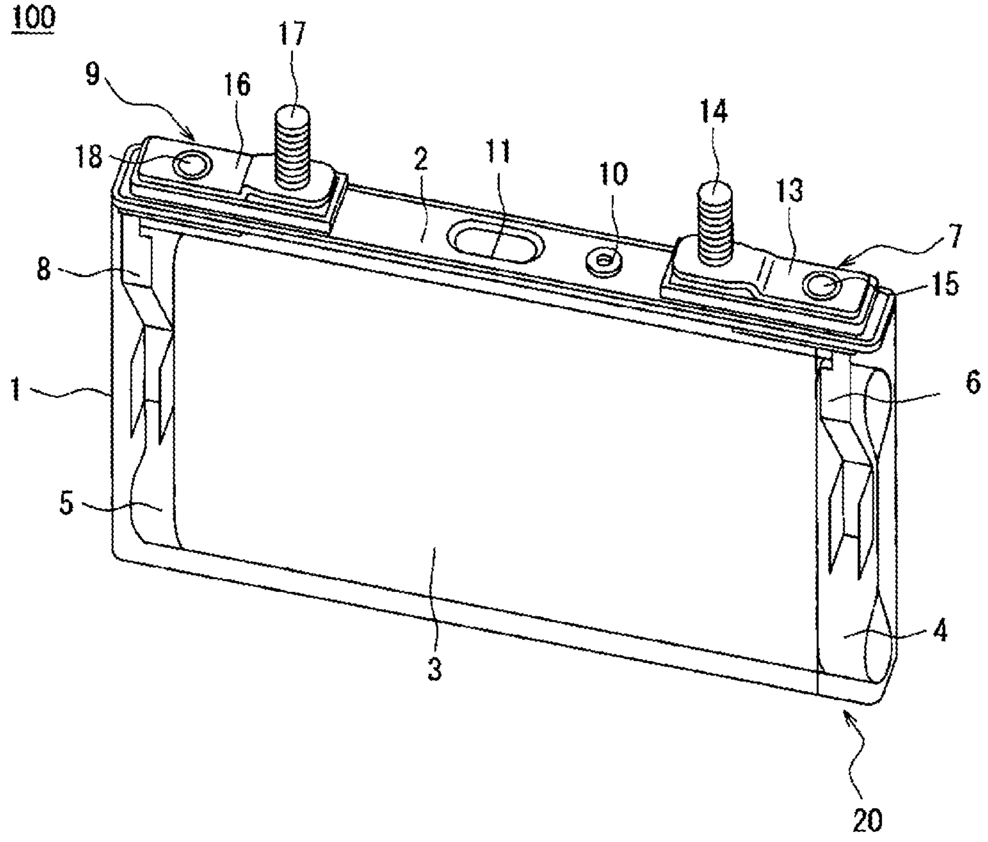
100
17
9
16
14
18
2
11
10
13
7
8
15
1
6
5
4
3
20

NONAQUEOUS ELECTROLYTE SECONDARY BATTERY POSITIVE ELECTRODE, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/045580 filed on Dec. 8, 2020 which claims the benefit of priority under 35 U.S.C. § 119 (a) of Japanese Patent Application No. 2019-228272 filed in Japan on Dec. 18, 2019, the contents of which are incorporated herein by reference.

TECHNICAL FIELD

The present disclosure relates to a positive electrode for non-aqueous electrolyte secondary battery and a non-aqueous electrolyte secondary battery.

BACKGROUND

In recent years, secondary batteries are required to have higher capacities, and secondary batteries containing a lithium transition metal composite oxide having a high Ni content as the positive electrode active material have attracted attention. Meanwhile, in terms of improving the safety of secondary batteries, positive electrodes are required to achieve thermal safety. Patent Literature 1 discloses a technique of using, as the positive electrode active material, a lithium transition metal composite oxide having a large average particle size and a high Ni content and a lithium transition metal composite oxide having a small average particle size and a low Ni content, in order to increase the capacity and improve the safety of a secondary battery. Further, Patent Literature 2 discloses that, by including lithium phosphate in the positive electrode mixture layer, oxidation reaction of a non-aqueous electrolyte at the time of overcharging can be suppressed.

CITATION LIST

Patent Literature

PATENT LITERATURE 1: Japanese Unexamined Patent Application Publication No. 2011-216485

PATENT LITERATURE 2: Japanese Unexamined Patent Application Publication No. 2011-150873

SUMMARY

Even when the two types of positive electrode active materials with different average particle sizes and Ni contents described in Patent Literature 1 are used, there are cases in which difficulties exist in improving the safety of secondary batteries while meeting the demand for increasingly higher capacities in recent years. Further, even when the lithium phosphate described in Patent Literature 2 is used, thermal safety may not be sufficiently improved in a high energy density positive electrode containing a positive electrode active material having a Ni content higher than 50 mol %. In other words, the techniques disclosed in Patent Literature 1 and Patent Literature 2 still have room for improvement in terms of simultaneously achieving an increase in energy density and an improvement in thermal safety of the positive electrode.

A positive electrode for non-aqueous electrolyte secondary battery according to one aspect of the present disclosure includes a positive electrode core and a positive electrode mixture layer formed on a surface of the positive electrode core. The positive electrode mixture layer contains at least a positive electrode active material and lithium phosphate. The positive electrode active material contains a first positive electrode active material in which the Ni content relative to the total molar amount of metal elements other than Li is 50 mol % to 65 mol %, and a second positive electrode active material in which the Ni content relative to the total molar amount of metal elements other than Li is 45 mol % or less. The ratio of the first positive electrode active material to the second positive electrode active material in the positive electrode mixture layer is 80:20 to 50:50 in mass ratio.

A non-aqueous electrolyte secondary battery according to one aspect of the present disclosure includes the above-described positive electrode for non-aqueous electrolyte secondary battery, a negative electrode, and a non-aqueous electrolyte.

Using the positive electrode for non-aqueous electrolyte secondary battery according to one aspect of the present disclosure, it is possible to provide a non-aqueous electrolyte secondary battery having a high capacity and improved safety.

BRIEF DESCRIPTION OF DRAWINGS

FIG. 1 is a perspective view of a secondary battery according to an example embodiment, and shows a structure inside a battery housing with a front side of an outer casing removed.

DESCRIPTION OF EMBODIMENTS

When a secondary battery is overcharged, the electrolyte is oxidized at the positive electrode and oxygen is released. When only one type of positive electrode active material is contained in the positive electrode mixture layer, a large amount of oxygen is released from all of the positive electrode active material at the same time. By using two types of positive electrode active materials with different average particle sizes and Ni contents, oxygen is released at timepoints corresponding to the respective positive electrode active materials, so that oxygen is released at a moderate rate, and advances can be made in achieving increased capacity and improved safety of the secondary battery. However, the effect thereof is not sufficient, and there are cases in which difficulties exist in simultaneously achieving an increase in energy density and an improvement in thermal safety of the positive electrode. Further, although the above-noted oxidation reaction of the electrolyte is suppressed by adding lithium phosphate to the positive electrode, the effect thereof may similarly be not sufficient. As a result of conducting diligent studies on these issues, the present inventors have found that the reaction suppressing effect of lithium phosphate contained in the positive electrode mixture layer is specifically enhanced in a state in which oxygen is released at a moderate rate. By configuring the positive electrode mixture layer to contain, at a predetermined ratio, two types of positive electrode active materials each having a Ni content within a predetermined range, and by adding lithium phosphate thereto, a positive electrode having a high energy density and achieving improved thermal safety can be obtained.

An example embodiment of the present disclosure will now be described in detail. Although a secondary battery 100 having a rectangular metal outer casing 1 is illustrated as an example in the present embodiment, the shape of the outer casing is not limited to a rectangular shape and may for example be a cylindrical shape, a coin shape, or the like, and the outer casing may be a battery housing composed of a laminate sheet including a metal layer and a resin layer. Further, although a spiral-type electrode assembly 3 in which a positive electrode and a negative electrode are wound with separators located between the electrodes is illustrated as an example, the electrode assembly may be of a laminated type formed by alternately laminating a plurality of positive electrodes and a plurality of negative electrodes one by one via separators. Further, although a case in which the mixture layer in each of the positive and negative electrodes is formed on both sides of the core is illustrated as an example, the present disclosure is not limited to a case in which each core has mixture layers formed on both sides, and it is sufficient so long as the core has a mixture layer formed on at least one surface.

As illustrated for example in FIG. 1, the secondary battery 100 comprises: a spiral-type electrode assembly 3 in which a positive electrode and a negative electrode are wound with separators located between the electrodes and are formed into a flat shape having a flat part and a pair of curved parts; an electrolyte; and an outer casing 1 that houses the electrode assembly 3 and the electrolyte. Both of the outer casing 1 and a sealing plate 2 are made of metal, and are preferably made of aluminum or an aluminum alloy.

The outer casing 1 has a bottom portion having a substantially rectangular shape as viewed from the bottom face, and a side wall portion erected on the peripheral edge of the bottom portion. The side wall portion is formed perpendicular to the bottom portion. The dimensions of the outer casing 1 are not particularly limited, but as an example, the outer casing 1 has a lateral length of 60 to 160 mm, a height of 60 to 100 mm, and a thickness of 10 to 40 mm.

The positive electrode is an elongate member which comprises a positive electrode core made of metal and positive electrode mixture layers formed on both sides of the core, and in which, at one end in the crosswise direction and along the lengthwise direction, the positive electrode core is exposed to form a strip-shaped positive electrode core exposed portion 4. Similarly, the negative electrode is an elongate member which comprises a negative electrode core made of metal and negative electrode mixture layers formed on both sides of the core, and in which, at one end in the crosswise direction and along the lengthwise direction, the negative electrode core is exposed to form a strip-shaped negative electrode core exposed portion 5. The electrode assembly 3 has a structure in which the positive electrode and the negative electrode are wound with separators located between the electrodes, with the positive electrode core exposed portion 4 of the positive electrode being arranged on one end side in the axial direction and the negative electrode core exposed portion 5 of the negative electrode being arranged on the other end side in the axial direction.

A positive electrode current collector 6 is connected to a laminated part of the positive electrode core exposed portion 4 of the positive electrode, and a negative electrode current collector 8 is connected to a laminated part of the negative electrode core exposed portion 5 of the negative electrode. A preferred positive electrode current collector 6 is made of aluminum or an aluminum alloy. A preferred negative electrode current collector 8 is made of copper or a copper alloy. A positive electrode terminal 7 comprises a positive electrode external conductive portion 13 arranged on the battery outer side of the sealing plate 2, a positive electrode bolt portion 14 connected to the positive electrode external conductive portion 13, and a positive electrode insertion portion 15 inserted into a through hole provided in the sealing plate 2, and the positive electrode terminal 7 is electrically connected to the positive electrode current collector 6. Further, a negative electrode terminal 9 comprises a negative electrode external conductive portion 16 arranged on the battery outer side of the sealing plate 2, a negative electrode bolt portion 17 connected to the negative electrode external conductive portion 16, and a negative electrode insertion portion 18 inserted into a through hole provided in the sealing plate 2, and the negative electrode terminal 9 is electrically connected to the negative electrode current collector 8.

The positive electrode terminal 7 and the positive electrode current collector 6 are fixed to the sealing plate 2 via an internal insulating member and an external insulating member, respectively. The internal insulating member is arranged between the sealing plate 2 and the positive electrode current collector 6, and the external insulating member is arranged between the sealing plate 2 and the positive electrode terminal 7. Similarly, the negative electrode terminal 9 and the negative electrode current collector 8 are fixed to the sealing plate 2 via an internal insulating member and an external insulating member, respectively. The internal insulating member is arranged between the sealing plate 2 and the negative electrode current collector 8, and the external insulating member is arranged between the sealing plate 2 and the negative electrode terminal 9.

The electrode assembly 3 is housed in the outer casing 1. The sealing plate 2 is connected to the opening edge part of the outer casing 1 by laser welding or the like. The sealing plate 2 has an electrolyte injection port 10, and this electrolyte injection port 10 is sealed with a sealing plug after the electrolyte is injected into the outer casing 1. The sealing plate 2 has formed therein a gas discharge valve 11 for discharging gas when pressure inside the battery reaches a predetermined value or higher.

Detailed descriptions will now be given regarding the positive electrode, the negative electrode, and the separator constituting the electrode assembly 3, and in particular regarding the positive electrode mixture layer constituting the positive electrode.

[Positive Electrode]

The positive electrode comprises a positive electrode core and a positive electrode mixture layer formed on a surface of the positive electrode core. For the positive electrode core, it is possible to use a foil of a metal stable in the potential range of the positive electrode such as aluminum or an aluminum alloy, a film having such a metal disposed on its surface layer, or the like. The thickness of the positive electrode core is, for example, 10 μm to 20 μm. The thickness of the positive electrode mixture layers is, for example, 10 μm to 150 μm on one side of the positive electrode core. The positive electrode can be produced by applying a positive electrode mixture slurry containing a positive electrode active material, a conductive material, a binder, and the like onto a surface of the positive electrode core, and drying and then compressing the applied coating.

Examples of the conductive material contained in the positive electrode mixture layer include carbon materials such as carbon black, acetylene black, Ketjen black, carbon nanotubes, and graphite. Examples of the binder contained in the positive electrode mixture layer include fluororesin such as polytetrafluoroethylene (PTFE) and polyvinylidene fluoride (PVdF), polyacrylonitrile (PAN), polyimide, acrylic resin, and polyolefin. In combination with these resins, carboxymethyl cellulose (CMC) or a salt thereof, polyethylene oxide (PRO), or the like may be used.

The positive electrode mixture layer contains at least a positive electrode active material and lithium phosphate. The positive electrode active material contains a first positive electrode active material in which the Ni content relative to the total molar amount of metal elements other than Li is 50 mol % to 65 mol %, and a second positive electrode active material in which the Ni content relative to the total molar amount of metal elements other than Li is 45 mol % or less. Further, the ratio of the first positive electrode active material to the second positive electrode active material in the positive electrode mixture layer is 80:20 to 50:50 in mass ratio. With these features, a positive electrode specifically having a high energy density and improved thermal safety can be obtained. Although the positive electrode mixture layer may contain a positive electrode active material other than the first positive electrode active material and the second positive electrode active material so long as the object of the present disclosure is not impaired, only the first positive electrode active material and the second positive electrode active material are contained as the positive electrode active material in the present embodiment.

In terms of increasing the capacity, the Ni content in the first positive electrode active material relative to the total molar amount of metal elements other than Li may be 50 mol % to 65 mol %, but is preferably 55 mol % to 65 mol %. The first positive electrode active material may contain at least one element other than Ni selected from, for example, Mn, Co, Mg, Zr, Mo, W, Cr, V, Ce, Ti, Fe, Si, K, Ga, In, Ca, Na, and Al. Further, the first positive electrode active material preferably contains at least Mn or Co. Since the crystal structure of the first positive electrode active material becomes unstable when the amount of Ni is too large, the crystal structure can be stabilized by including an appropriate amount of Mn or Co. A preferred example of the first positive electrode active material is a composite oxide represented by general formula $Li_{\alpha}Ni_xCo_yMn_zM_{(1-x-y-z)}O_2$ (where $1.00\leq\alpha\leq1.20$, $0.50\leq x\leq0.65$, $0.05\leq y\leq0.35$, $0.05\leq z\leq0.35$, and M is at least one element selected from Mg, Zr, Mo, W, Cr, V, Ce, Ti, Fe, Si, K, Ga, In, Ca, Na, and Al).

In terms of improving thermal safety, the Ni content in the second positive electrode active material relative to the total molar amount of metal elements other than Li may be 45 mol % or less, but is preferably 40 mol % or less, and more preferably 35 mol % or less. The lower limit of the Ni content in the second positive electrode active material relative to the total molar amount of metal elements other than Li is not particularly limited so long as the second positive electrode active material contains Ni, but in terms of increasing the capacity, the Ni content is preferably 20 mol % or more, and more preferably 30 mol % or more. The second positive electrode active material may contain at least one element other than Ni selected from, for example, Mn, Co, Mg, Zr, Mo, W, Cr, V, Ce, Ti, Fe, Si, K, Ga, In, Ca, Na and Al. Further, the second positive electrode active material preferably contains at least Mn or Co. Since the crystal structure of the second positive electrode active material becomes unstable when the amount of Ni is too large, the crystal structure can be stabilized by including an appropriate amount of Mn or Co. A preferred example of the second positive electrode active material is a composite oxide represented by general formula $Li_{\beta}Ni_pCo_qMn_rM_{(1-p-q-r)}O_2$ (where $1.00\leq\beta\leq1.20$, $0<p\leq0.45$, $0.05\leq q\leq0.50$, $0.05\leq r\leq0.50$, and M is at least one element selected from Mg, Zr, Mo, W, Cr, V, Ce, Ti, Fe, Si, K, Ga, In, Ca, Na, and Al).

The volume-based median diameter (D50) of the first positive electrode active material may be larger than the volume-based median diameter (D50) of the second positive electrode active material. With this feature, the packing density of the positive electrode active material is increased, and the energy density of the positive electrode can thereby be further increased. The volume-based median diameter (D50) of the first positive electrode active material is preferably 10 μm to 20 μm. When within this range, the surface area of the positive electrode active material can be set within an appropriate range, so that a positive electrode having a higher energy density and improved thermal safety can be obtained. Here, a median diameter (D50) means a particle size at which, in a volume-based particle size distribution, the cumulative frequency from the smaller particle size side reaches 50%, and is also called a med-level diameter. A particle size distribution of a lithium transition metal composite oxide can be measured using a laser diffraction type particle size distribution measuring device (for example, MT3000II manufactured by MicrotracBEL Corp.) and by using water as a dispersion medium. The volume-based median diameter (D50) of lithium phosphate described further below can also be measured in the same manner.

Each of the first positive electrode active material and the second positive electrode active material may be, for example, secondary particles formed by aggregation of primary particles. The average primary particle size of the first positive electrode active material and the second positive electrode active material can be, for example, 0.05 μm to 3 μm. The average primary particle size is determined by analyzing a cross-sectional SEM image observed using a scanning electron microscope (SEM). For example, a cross section of a positive electrode mixture layer is prepared by embedding a positive electrode in a resin and carrying out a cross-section polisher (CP) processing or the like, and this cross section is photographed by an SEM. Alternatively, a cross section of a positive electrode active material is prepared by embedding the positive electrode active material in a resin and carrying out a CP processing or the like, and this cross section is photographed by an SEM. Then, from the cross-sectional SEM image, 30 primary particles are randomly selected. Grain boundaries of the selected 30 primary particles are observed to identify the outer shapes of the primary particles. Subsequently, the length (i.e., the longest diameter) is determined respectively for the 30 primary particles, and an average value thereof is used as the average primary particle size.

An example method for producing the first positive electrode active material and the second positive electrode active material will now be described in detail.

The first positive electrode active material is synthesized by firing a mixture A, which contains a lithium compound, and also contains a transition metal compound obtained by a coprecipitation method and containing Ni in an amount of 50 mol % to 65 mol %. Examples of the lithium compound contained in the mixture A include, for example, $Li_2CO_3$, LiOH, $Li_2O_3$, $Li_2O$, $LiNO_3$, $LiNO_2$, $Li_2SO_4$, $LiOH\cdot H_2O$, LiH, and LiF. As to the firing conditions of the mixture A, the firing temperature can for example be 850° C. to 990° C., and the firing time can for example be 3 hours to 10 hours. By extending the reaction time in the coprecipitation method in the process of manufacturing the transition metal compound, the volume-based median diameter (D50) of the first positive electrode active material can be increased. Further, the firing may for example be performed under a gas flow of oxygen or air.

The second positive electrode active material is synthesized by firing a mixture B, which contains a lithium compound, and also contains a transition metal compound obtained by a coprecipitation method and containing Ni in an amount of 45 mol % or less.

Examples of the lithium compound contained in the mixture B include, for example, $Li_2CO_3$, LiOH, $Li_2O_3$, $Li_2O$, $LiNO_3$, $LiNO_2$, $Li_2SO_4$, $LiOH{\cdot}H_2O$, LiH, and LiF. As to the firing conditions of the mixture B, the firing temperature can for example be 850° C. to 990° C., and the firing time can for example be 3 hours to 10 hours. By extending the reaction time in the coprecipitation method in the process of manufacturing the transition metal compound, the volume-based median diameter (D50) of the second positive electrode active material can be increased. Further, the firing may for example be performed under a gas flow of oxygen or air.

The lithium phosphate content in the positive electrode mixture layer may be 0.3% by mass to 2% by mass. When within this range, it is possible to simultaneously achieve an increase in energy density and an improvement in thermal safety of the positive electrode with a better balance.

The volume-based median diameter (D50) of the lithium phosphate may be 2 umm to 5 μm. When the D50 is 2 μm or larger, powder fluidity of the lithium phosphate is enhanced and its dispersibility in the positive electrode mixture layer is improved. When the D50 is 5 μm or smaller, the surface area is sufficiently large, so that the effect of suppressing the reaction between the electrolyte and the positive electrode active material can be further enhanced.

[Negative Electrode]

The negative electrode comprises a negative electrode core and a negative electrode mixture layer formed on both sides of the negative electrode core. For the negative electrode core, it is possible to use a foil of a metal stable in the potential range of the negative electrode such as copper or a copper alloy, a film having such a metal disposed on its surface layer, or the like. The negative electrode mixture layer contains a negative electrode active material and a binder. The thickness of the negative electrode mixture layer is, for example, 10 μm to 150 μm on one side of the negative electrode core. The negative electrode can be produced by applying a negative electrode mixture slurry containing the negative electrode active material, the binder, and the like onto surfaces of the negative electrode core, and after drying the applied coating, rolling the applied coating to form negative electrode mixture layers on both sides of the negative electrode core.

The negative electrode active material contained in the negative electrode mixture layer is not particularly limited so long as it can reversibly occlude and release lithium ions, and a carbon material such as graphite is generally used therefor. The graphite may be either natural graphite such as scaly graphite, lump graphite, and earthy graphite, or artificial graphite such as lump artificial graphite and graphitized mesophase carbon microbeads. As the negative electrode active material, it is also possible to use a metal that forms an alloy with Li such as Si or Sn, a metal compound containing Si, Sn, or the like, a lithium titanium composite oxide, and so on, and these materials having a carbon coating provided thereon may also be used. For example, in combination with graphite, a Si-containing compound represented by $SiO_x$ (where $0.5 \leq x \leq 1.6$), a Si-containing compound in which fine particles of Si are dispersed in a lithium silicate phase represented by $Li_{2y}SiO_{(2+y)}$ (where $0<y<2$), or the like may be used.

As the binder contained in the negative electrode mixture layer, fluororesin such as PTFE or PVdF, PAN, polyimide, acrylic resin, polyolefin, or the like may be used as with the positive electrode, but styrene-butadiene rubber (SBR) is preferably used. The negative electrode mixture layer may further contain CMC or a salt thereof, polyacrylic acid (PAA) or a salt thereof, polyvinyl alcohol (PVA), and the like.

[Separator]

For the separator, for example, a porous sheet having ion permeability and insulating property is used. Specific examples of the porous sheet include a microporous thin film, a woven fabric, and a non-woven fabric. As the material of the separator, olefins such as polyethylene and polypropylene, cellulose, and the like are preferred. The separator may have a single-layer structure or a laminated structure. On a surface of the separator, there may be provided a resin layer made of a resin having high heat resistance such as aramid resin, or a filler layer containing an inorganic compound filler.

[Non-Aqueous Electrolyte]

The non-aqueous electrolyte includes, for example, a non-aqueous solvent and an electrolyte salt dissolved in the non-aqueous solvent. As the non-aqueous solvent, it is possible to use, for example, an ester, an ether, a nitrile such as acetonitrile, an amide such as dimethylformamide, a mixed solvent containing two or more of the foregoing, or the like. The non-aqueous solvent may contain a halogen-substituted product obtained by substituting at least part of the hydrogens in the above solvents with a halogen atom such as fluorine. Examples of the halogen-substituted product include fluorinated cyclic carbonate ester such as fluoroethylene carbonate (FEC); fluorinated chain carbonate ester; and fluorinated chain carboxylate ester such as fluoro methyl propionate (FMP).

Examples of the above-noted ester include: cyclic carbonate ester such as ethylene carbonate (EC), propylene carbonate (PC), and butylene carbonate; chain carbonate ester such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate ester such as γ-butyrolactone (GBL) and γ-valerolactone (GVL); and chain carboxylate ester such as methyl acetate, ethyl acetate, propyl acetate, methyl propionate (MP), and ethyl propionate (EP).

Examples of the above-noted ether include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is preferably lithium salt. Examples of lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2+1})_x$ (where 1<x<6, and n is 1 or 2), $LiB_{10}Cl_{10}$, LiCl, LiBr, LiI, chloroborane lithium, lower aliphatic lithium carboxylate, borates such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ (where l and m each are an integer of 0 or greater). As the lithium salt, a single type among the above may be used alone, or a plurality of types may be mixed and used. Among the foregoing, it is preferable to use $LiPF_6$ in consideration of ion conductivity, electrochemical stability, and the like. The concentration of the lithium salt may be, for example, 0.8 mol to 1.8 mol per 1 liter of the non-aqueous solvent. Further, vinylene carbonate or a propane sultone based additive may be added.

EXAMPLES

While the present disclosure is further described below by reference to Examples, the present disclosure is not limited to these Examples.

Example 1

[Production of Positive Electrode]

As the first positive electrode active material, a composite oxide A represented by general formula $LiNi_{0.55}Co_{0.20}Mn_{0.25}O_2$ was used, and as the second positive electrode active material, a composite oxide B represented by general formula $LiNi_{0.35}Co_{035}Mn_{0.30}O_2$ was used. The volume-based median diameter (D50) of the composite oxide A was 15.2 μm, and the volume-based median diameter (D50) of the composite oxide B was 3.8 μm. The composite oxide A, the composite oxide B, and lithium phosphate ($Li_3PO_4$) having a volume-based median diameter (D50) of 3.4 μm were mixed at a mass ratio of 70:30:0.6 to obtain a mixture. A positive electrode mixture slurry was prepared by mixing this mixture in an amount of 96.7 parts by mass, mixing carbon black serving as a conductive material in an amount of 2.1 parts by mass, mixing polyvinylidene fluoride (PVdF) serving as a binder in an amount of 1.2 parts by mass, and further adding an appropriate amount of N-methyl-2-pyrrolidone (NMP). This slurry was uniformly applied to one side of a positive electrode core made of an aluminum foil having a thickness of 15 μm, and the applied coating was dried and then compressed using a roller. A positive electrode in which a positive electrode mixture layer having a packing density of 3.5 g/cm$^3$ was formed on one side of the positive electrode core was thereby produced.

[Preparation of Non-Aqueous Electrolyte]

Ethylene carbonate (EC) and ethyl methyl carbonate (EMC) were mixed in a volume ratio of 30:70. Into this mixed solvent, lithium hexafluorophosphate ($LiPF_6$) was added at a concentration of 1 mol/liter. Further, vinylene carbonate (VC) was added at an adding ratio of 0.3% by mass relative to the total mass of this mixed solvent, and a non-aqueous electrolyte was thereby prepared.

[Production of Test Cell]

An aluminum lead was attached to a surface of the positive electrode core of the above-described positive electrode, and a nickel lead was attached to a lithium metal foil serving as a negative electrode. A spiral electrode assembly was produced by winding the positive electrode and the negative electrode in a spiral shape with polyolefin separators disposed between the electrodes. This electrode assembly was housed in an outer casing composed of an aluminum laminate sheet, and after injecting the above-described non-aqueous electrolyte, the opening of the outer casing was sealed to obtain a test cell.

[Evaluation of Charge Capacity]

With respect to the above-described test cell, under a temperature condition of 25° C., constant current charging was performed at a current density of 0.2 mA/cm$^2$ until reaching a voltage of 4.3 V with respect to Li+/Li. Then, constant voltage charging was performed with a voltage of 4.3 V with respect to Li+/Li until the current density became 0.04 mA/cm$^2$, and the charge capacity was determined. The charge capacity value was divided by the total mass of the composite oxide A and the composite oxide B, which are the positive electrode active materials, to obtain the charge capacity per unit mass. Subsequent to the above-described charging, after a 10-minute pause, constant current discharge was performed at a current density of 0.2 mA/cm$^2$ until reaching a voltage of 2.5 V with respect to Li+/Li.

[Evaluation of Amount of Exothermic Heat]

For the purpose of understanding the thermal stability of the positive electrode, thermal analysis was performed using a differential scanning calorimeter (DSC: differential scanning calorimetry) in coexistence of the positive electrode in a charged state and the electrolyte solution. With respect to the above-described test cell, under a temperature condition of 25° C., constant current charging was performed at a current density of 0.2 mA/cm$^2$ until reaching a voltage of 4.3 V with respect to Li+/Li, and then constant voltage charging was performed with a voltage of 4.3 V with respect to Li+/Li until the current density became 0.04 mA/cm$^2$. After that, the test cell was disassembled, and the positive electrode was retrieved. The retrieved positive electrode was washed with dimethyl carbonate (DMC) to remove the electrolyte solution, and then punched into a disk shape having a diameter of 2 mm. This disk-shaped sample was sealed in a pressure-resistant airtight container together with 2 μL of the non-aqueous electrolyte solution, and was used as a measurement sample. Using a DSC, this measurement sample was heated from 25° C. to 350° C. at a heating rate of 5° C./min to investigate the amount of exothermic heat. The amount of exothermic heat was divided by the total mass of the composite oxide A and the composite oxide B, which are the positive electrode active materials, to obtain the amount of exothermic heat per unit mass.

Comparative Examples 1 to 5

Performance evaluation was conducted in the same manner as in Example 1 except that the mixing mass ratio of the composite oxide A, the composite oxide B, and lithium phosphate ($Li_3PO_4$) was changed as shown in Table 1. Table 1 shows the results for Example 1 and Comparative Examples 1 to 5.

TABLE 1

| | Mixing Ratio (Mass Ratio) | | | Characteristics (Per Unit Mass) | |
|---|---|---|---|---|---|
| | Composite Oxide A | Composite Oxide B | $Li_3PO_4$ | Charge Capacity (mAh/g) | Amount of Exothermic Heat (J/g) |
| Example 1 | 70 | 30 | 0.6 | 190 | 514 |
| Comparative Example 1 | 70 | 30 | 0 | 191 | 668 |

TABLE 1-continued

| | Mixing Ratio (Mass Ratio) | | | Characteristics (Per Unit Mass) | |
|---|---|---|---|---|---|
| | Composite Oxide A | Composite Oxide B | $Li_3PO_4$ | Charge Capacity (mAh/g) | Amount of Exothermic Heat (J/g) |
| Comparative Example 2 | 100 | 0 | 0.6 | 194 | 584 |
| Comparative Example 3 | 100 | 0 | 0 | 194 | 687 |
| Comparative Example 4 | 0 | 100 | 0.6 | 178 | 500 |
| Comparative Example 5 | 0 | 100 | 0 | 179 | 541 |

In respectively comparing Example 1 with Comparative Example 1, Comparative Example 2 with Comparative Example 3, and Comparative Example 4 with Comparative Example 5, it was found that the charge capacity was the same when the ratio of the composite oxide A and the composite oxide B was the same, and that the amount of exothermic heat could be reduced in the test cells containing $Li_3PO_4$. In particular, in Example 1, the amount of exothermic heat could be significantly reduced as compared with Comparative Example 1, and the effect of $Li_3PO_4$ could be specifically increased as compared with Comparative Examples 2 and 3 and Comparative Examples 4 and 5.

Examples 2 to 5 and Comparative Example 6

Performance evaluation was conducted in the same manner as in Example 1 except that the composition of each of the composite oxide A and the composite oxide B was changed as shown in Table 2. Table 2 shows the results for Examples 1 to 5 and Comparative Example 6. Here, it was confirmed that all of the positive electrode active materials used in Examples 2 to 5 and Comparative Example 6 satisfied the following: (D50 of First Positive Electrode Active Material)> (D50 of Second Positive Electrode Active Material); and 10 μm≤(D50 of First Positive Electrode Active Material)≤20 μm.

TABLE 2

| | Composition Ratio (Ni/Co/Mn) | | Amount of | Characteristics (Per Unit Mass) | |
|---|---|---|---|---|---|
| | 1st Positive Electrode Active Material | 2nd Positive Electrode Active Material | $Li_3PO_4$ Added (%) | Charge Capacity (mAh/g) | Amount of Exothermic Heat (J/g) |
| Example 1 | 55/20/25 (A) | 35/35/30 (B) | 0.6 | 190 | 514 |
| Example 2 | 50/20/30 | 35/35/30 | 0.6 | 187 | 494 |
| Example 3 | 60/20/20 | 35/35/30 | 0.6 | 192 | 534 |
| Example 4 | 65/20/15 | 35/35/30 | 0.6 | 195 | 555 |
| Example 5 | 60/20/20 | 45/35/20 | 0.6 | 191 | 552 |
| Comparative Example 6 | 45/20/35 | 35/35/30 | 0.6 | 184 | 526 |

While the charge capacity and the amount of exothermic heat were both satisfactory in each of Examples 2 to 5, the charge capacity was significantly reduced in Comparative Example 6.

<Examples 6 to 8 and Comparative Example 7>>

Performance evaluation was conducted in the same manner as in Example 1 except that the mixing mass ratio of the composite oxide A and the composite oxide B was changed as shown in Table 3. Table 3 shows the results for Example 1, Examples 6 to 8, and Comparative Example 7.

TABLE 3

| | Mixing Ratio (Mass Ratio) | | | Characteristics (Per Unit Mass) | |
|---|---|---|---|---|---|
| | Composite Oxide A | Composite Oxide B | $Li_3PO_4$ | Charge Capacity (mAh/g) | Amount of Exothermic Heat (J/g) |
| Example 6 | 40 | 60 | 0.6 | 186 | 525 |
| Example 7 | 50 | 50 | 0.6 | 187 | 522 |
| Example 1 | 70 | 30 | 0.6 | 190 | 514 |
| Example 8 | 80 | 20 | 0.6 | 191 | 537 |
| Comparative Example 7 | 90 | 10 | 0.6 | 193 | 581 |

While the charge capacity and the amount of exothermic heat were both satisfactory in each of Examples 6 to 8, the amount of exothermic heat was significantly increased in Comparative Example 7.

Examples 9 to 12

Performance evaluation was conducted in the same manner as in Example 1 except that, as the first positive electrode active material, materials having the same composition as that of Example 1 and in which only the D50 was set to respective values shown in Table 4 were used. Table 4 shows the results for Example 1 and Examples 9 to 12.

TABLE 4

| | D50 of 1st Positive Electrode Active Material (μm) | Characteristics (Per Unit Mass) Charge Capacity (mAh/g) | Amount of Exothermic Heat (J/g) |
|---|---|---|---|
| Example 9 | 7.7 | 191 | 562 |
| Example 10 | 10.9 | 190 | 523 |
| Example 1 | 15.2 | 190 | 514 |
| Example 11 | 17.8 | 188 | 510 |
| Example 12 | 23.1 | 186 | 498 |

In each of Examples 9 to 12, the charge capacity and the amount of exothermic heat were both satisfactory.

Examples 13 to 15

Performance evaluation was conducted in the same manner as in Example 1 except that the amount of $Li_3PO_4$ added was changed as shown in Table 5. Table 5 shows the results for Example 1 and Examples 13 to 15.

TABLE 5

| | Mixing Ratio (Mass Ratio) | | | Characteristics (Per Unit Mass) | |
|---|---|---|---|---|---|
| | Composite Oxide A | Composite Oxide B | $Li_3PO_4$ | Charge Capacity (mAh/g) | Amount of Exothermic Heat (J/g) |
| Example 13 | 70 | 30 | 0.3 | 191 | 523 |
| Example 1 | 70 | 30 | 0.6 | 190 | 514 |
| Example 14 | 70 | 30 | 1.5 | 187 | 508 |
| Example 15 | 70 | 30 | 2.0 | 186 | 505 |

In each of Examples 13 to 15, the charge capacity and the amount of exothermic heat were both satisfactory.

Examples 16 and 17

Performance evaluation was conducted in the same manner as in Example 1 except that $Li_3PO_4$ having a D50 as shown in Table 6 was used. Table 6 shows the results for Example 1 and Example 16 and 17.

TABLE 6

| | D50 of $Li_3PO_4$ (μm) | Characteristics (Per Unit Mass) Charge Capacity (mAh/g) | Amount of Exothermic Heat (J/g) |
|---|---|---|---|
| Example 1 | 3.4 | 190 | 514 |
| Example 16 | 4.7 | 190 | 521 |
| Example 17 | 7.4 | 190 | 552 |

In Examples 16 and 17, the charge capacity and the amount of exothermic heat were both satisfactory. In particular, in Examples 1 and 16 in which the D50 of $Li_3PO_4$ was 5 μm or smaller, the amount of exothermic heat could be significantly reduced as compared with Example 17 in which the D50 of $Li_3PO_4$ was larger than 5 jam. It is presumed that this result was obtained because the effect of suppressing the reaction between the electrolyte and the positive electrode active material could be further enhanced due to the surface area of $Li_3PO_4$ being sufficiently large.

REFERENCE SIGNS LIST

1 outer casing
2 sealing plate
3 electrode assembly
4 positive electrode core exposed portion
5 negative electrode core exposed portion
6 positive electrode current collector
7 positive electrode terminal
8 negative electrode current collector
9 negative electrode terminal
10 electrolyte injection port
11 gas discharge valve
13 positive electrode external conductive portion
14 positive electrode bolt portion
15 positive electrode insertion portion
16 negative electrode external conductive portion
17 negative electrode bolt portion
18 negative electrode insertion portion
100 secondary battery

The invention claimed is:

1. A positive electrode for a non-aqueous electrolyte secondary battery, comprising
a positive electrode core and a positive electrode mixture layer formed on a surface of the positive electrode core, wherein
the positive electrode mixture layer contains at least a positive electrode active material and lithium phosphate,
the positive electrode active material contains a first positive electrode active material in which Ni content relative to a total molar amount of metal elements other than Li is 50 mol % to 65 mol %, and a second positive electrode active material in which Ni content relative to a total molar amount of metal elements other than Li is 45 mol % or less, a ratio of the first positive electrode active material to the second positive electrode active material in the positive electrode mixture layer is 80:20 to 50:50 in mass ratio, and
a volume-based median diameter (D50) of the lithium phosphate is 3.4 μm to 5 μm.

2. The positive electrode for the non-aqueous electrolyte secondary battery according to claim 1, wherein a volume-based median diameter (D50) of the first positive electrode active material is larger than a volume-based median diameter (D50) of the second positive electrode active material, and is 10 μm to 20 μm.

3. The positive electrode for the non-aqueous electrolyte secondary battery according to claim 1, wherein a content of the lithium phosphate in the positive electrode mixture layer is 0.3% by mass to 2% by mass.

4. A non-aqueous electrolyte secondary battery comprising the positive electrode for the non-aqueous electrolyte secondary battery according to claim 1, a negative electrode, and a non-aqueous electrolyte.

* * * * *